(12) United States Patent
Cheng

(10) Patent No.: US 11,514,710 B2
(45) Date of Patent: Nov. 29, 2022

(54) DISPLAY PANEL AND TERMINAL DEVICE

(71) Applicant: BEIJING XIAOMI MOBILE SOFTWARE CO., LTD., Beijing (CN)

(72) Inventor: Chih-jen Cheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/917,569

(22) Filed: Jun. 30, 2020

(65) Prior Publication Data
US 2021/0224503 A1 Jul. 22, 2021

(30) Foreign Application Priority Data

Jan. 17, 2020 (CN) .......................... 202010055415.4

(51) Int. Cl.
| | |
|---|---|
| *G06K 9/00* | (2022.01) |
| *G09G 5/10* | (2006.01) |
| *G09G 3/36* | (2006.01) |
| *G06V 40/13* | (2022.01) |
| *G06F 3/042* | (2006.01) |
| *G06F 3/041* | (2006.01) |

(52) U.S. Cl.
CPC .......... *G06V 40/1318* (2022.01); *G06F 3/042* (2013.01); *G06F 3/0412* (2013.01); *G09G 3/3607* (2013.01); *G09G 5/10* (2013.01); *G09G 2360/141* (2013.01)

(58) Field of Classification Search
CPC .. G09G 3/3607; G09G 2360/141; G09G 5/10; G06K 9/0004; G06F 3/0412; G06F 3/042; G06V 40/1318
See application file for complete search history.

(56) References Cited

U.S. PATENT DOCUMENTS

| | | | | |
|---|---|---|---|---|
| 2006/0011913 A1* | 1/2006 | Yamazaki | .......... | G06V 40/1318 257/53 |
| 2008/0036951 A1* | 2/2008 | Tsai | .................... | G02F 1/13338 349/110 |

(Continued)

FOREIGN PATENT DOCUMENTS

| | | | |
|---|---|---|---|
| CN | 107065274 A | 8/2017 | |
| CN | 108828816 A * | 11/2018 | ........... G02F 1/1333 |
| CN | 108828816 A | 11/2018 | |

OTHER PUBLICATIONS

Extended European Search Report in the European Application No. 20181665.9 dated Dec. 21, 2020, (9p).

*Primary Examiner* — Amare Mengistu
*Assistant Examiner* — Jennifer L Zubajlo
(74) *Attorney, Agent, or Firm* — Arch & Lake LLP

(57) ABSTRACT

Provided are a display panel and a terminal device. The display panel includes: a display array including a plurality of display portions, the display portion including at least one display subportion; and a plurality of image detectors configured to detect photo signals to obtain a target detection image, the plurality of image detectors being adjacent to the plurality of display portions and having first distribution positions and second distribution positions, the first distribution positions being different from the second distribution positions. The plurality of image detectors are distributed at different distribution positions at the adjacent positions of the plurality of display portions of the display array in different distribution manners.

18 Claims, 9 Drawing Sheets

(56) References Cited

U.S. PATENT DOCUMENTS

| | | | |
|---|---|---|---|
| 2012/0206512 A1* | 8/2012 | Kim | G09G 3/3648 |
| | | | 345/88 |
| 2015/0331508 A1* | 11/2015 | Nho | H01L 27/323 |
| | | | 345/173 |
| 2016/0048053 A1 | 2/2016 | Kim et al. | |
| 2016/0266695 A1* | 9/2016 | Bae | G06V 40/1318 |
| 2018/0068166 A1* | 3/2018 | Zeng | G06V 10/143 |
| 2018/0267354 A1 | 9/2018 | Kim et al. | |
| 2019/0122025 A1* | 4/2019 | Gove | G06V 40/1382 |
| 2019/0347987 A1* | 11/2019 | Zhao | G09G 3/3233 |
| 2020/0097698 A1* | 3/2020 | Seo | G06F 3/041661 |

\* cited by examiner

DISPLAY PANEL AND TERMINAL DEVICE

CROSS-REFERENCE TO RELATED APPLICATION

This application is based upon and claims priority to Chinese patent application No. 202010055415.4 filed on Jan. 17, 2020, the entire content of which is incorporated herein by reference.

TECHNICAL FIELD

The present disclosure generally relates to electronic technologies, and particularly to a display panel and a terminal device.

BACKGROUND

Along with continuous innovation of display technologies, full screen has been widely used in various electronic products. For obtaining a full screen, various functional components may be integrated with a display screen, so that it is unnecessary to reserve a space for arranging functional components outside the screen. For example, an in-screen image acquisition component and sensor, etc. may be arranged in gaps between pixels of the display screen, and sensing functions thereof may be realized based on the display gaps of the display screen.

However, a display screen is required to meet requirements on an aperture ratio, a resolution and the like and consequently cannot provide a too large arrangement space for functional components. Therefore, such an in-screen functional component for image acquisition usually has relatively low resolution and other problems, thereby impacting performance of operation.

SUMMARY

The present disclosure provides a display panel and a terminal device.

According to a first aspect of the present disclosure, a display panel may include: a display array including a plurality of display portions, each of the plurality of display portions including at least one display subportion; and a plurality of image detectors configured to detect photosignals to obtain a target detection image.

According to a second aspect of the present disclosure, a terminal device may include: a shell; any abovementioned display panel, arranged on the shell; and a controller, arranged in the shell and configured to control the plurality of image detectors in the display panel for image detection.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
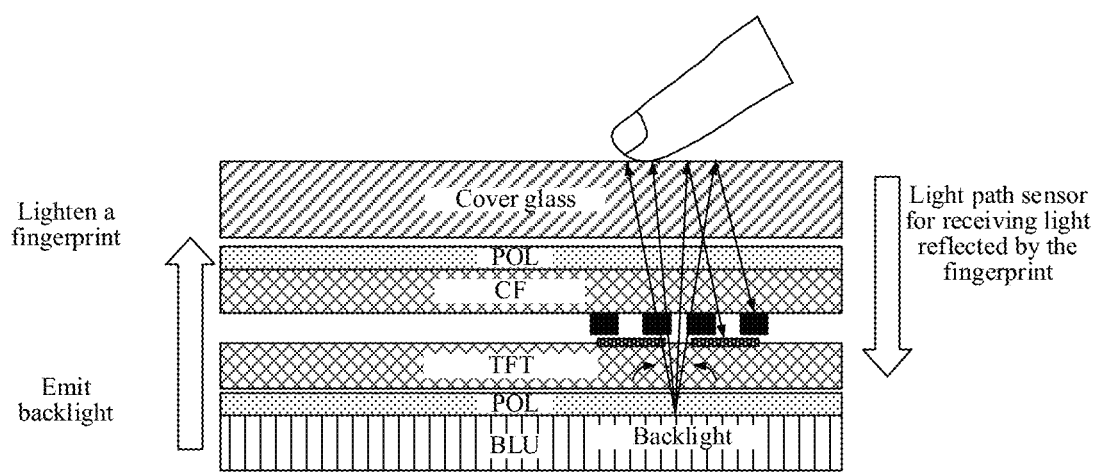
FIG. 1 is a schematic diagram illustrating fingerprint acquisition within a display panel according to an example.

Because of problems about the cost and the display effect, an in-screen fingerprint technology for full screens is only applied to Organic Light-Emitting Diode (OLED) display screens. For a Liquid Crystal Display (LCD) screen, due to the existence of backlight, photosensors and circuits, i.e., the abovementioned image detectors, may be integrated into a Thin Film Transistor (TFT) substrate, as shown in FIG. 1, to acquire a fingerprint image.

Figure 2:
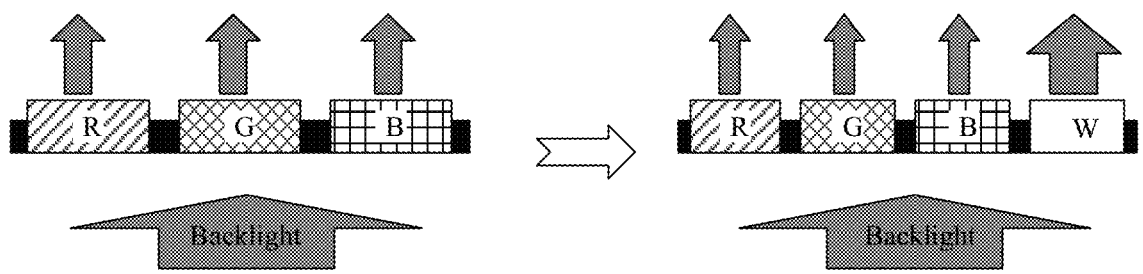
FIG. 2 is a schematic diagram illustrating improvement of a display aperture ratio according to an example.

However, integrating a photosensor into TFT glass may block transmitted light of part of backlight, impacting a display aperture ratio. Therefore, it is unlikely to take both the display aperture ratio and in-screen fingerprint recognition into consideration. For improving the aperture ratio, RGBW pixel layout may be adopted, as shown in FIG. 2, so that power consumption of a backlight source may be reduced while the same display brightness is maintained, or the display brightness may be improved while brightness of the backlight source is kept unchanged.

Figure 3:
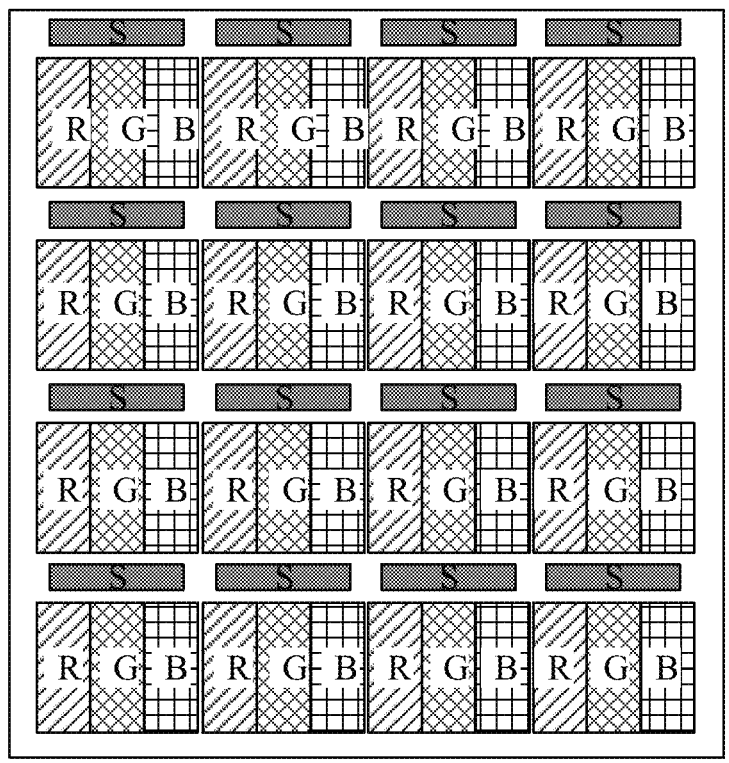
FIG. 3 is a schematic diagram illustrating distribution of photosensors according to an example.

A Full High Definition (FHD) display screen is taken as an example. When it is a 6.5-inch display screen, a pixel resolution is about 400 dpi. As shown in FIG. 3, a photosensor S may be arranged for each pixel (including RGB subpixels), so that the fingerprint recognition resolution can also be about 400 dpi. To implement fingerprint recognition, an image usually needs to have a resolution greater than 363 dpi. Alternatively, the image needs to have a resolution greater than 326 dpi and have a larger area, for example, a 10 mm×10 mm image, to implement fingerprint recognition.

After pixels W are added, if a size of a subpixel is kept unchanged, (note: the subpixel represents a minimum pixel portion in a single color herein), the resolution may be reduced to about 300 dpi, and meanwhile, the resolution of the photosensor is also reduced to about 300 dpi. Consequently, the fingerprint recognition effect is worsened.

Figure 4:
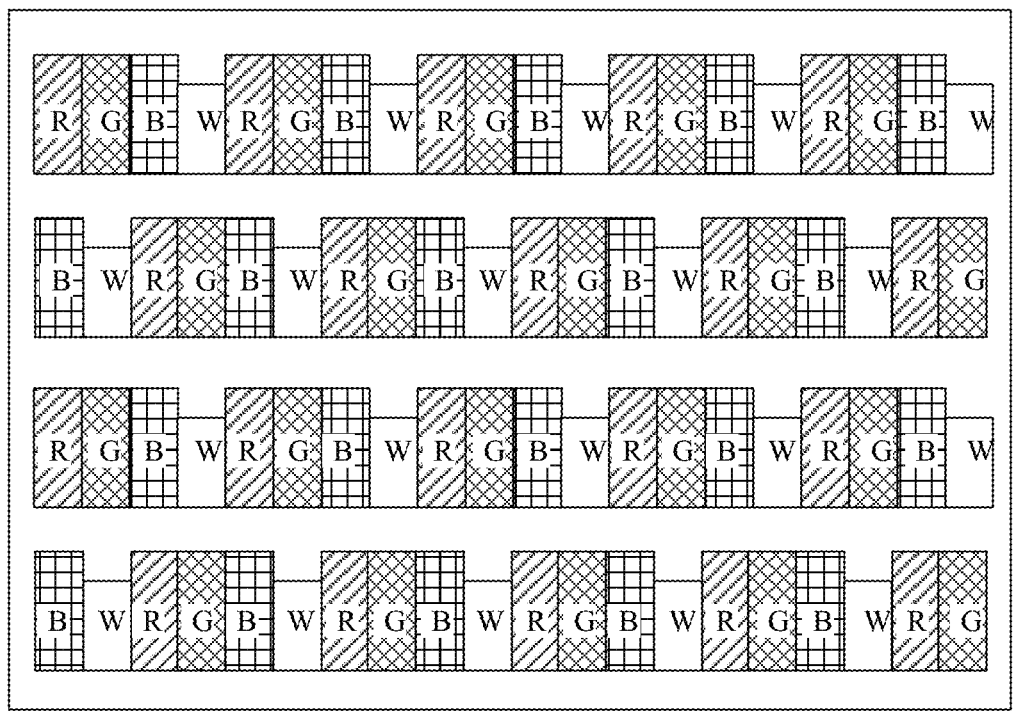
FIG. 4 is a schematic diagram illustrating pixel layout of a display panel according to an example.

A pixel layout shown in FIG. 4 is an RGBW layout. Since an area ratio of RGBW may be 1:1:1:0.75 according to a requirement of a relationship between a visual effect and a display algorithm, photosensors may be arranged near pixels W, and meanwhile, for improving a detection resolution, the photosensors may be laid out more densely. However, in such a manner, ambient light around each photosensor may be different, bringing inconvenience to data processing and further reducing the detection accuracy. If twice as many sensors are directly adopted, for example, a photosensor is correspondingly arranged nearby RG pixels and then a photosensor is arranged nearby pixels BW, the overall sensor resolution may be improved to 600 dpi. However, the photosensors are required to be arranged on a BM, resulting in almost the whole aperture being occupied by the circuit and the wiring space and the display brightness being reduced. In addition, the BM may be further enlarged, a dark region gets visible to naked eyes accordingly. Therefore, for the number of the sensors in an LCD panel, bigger does not mean better, and the display effect needs to be considered at the same time.

Figure 5A:
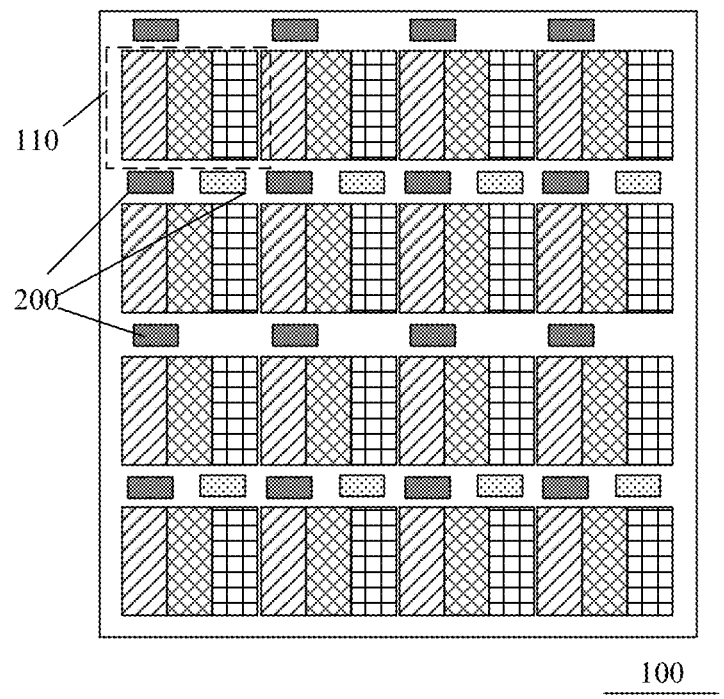
FIG. 5A is a structure diagram of a display panel according to an example.

FIG. 5A is a structure diagram of a display panel according to an example. As shown in FIG. 5A, the display panel includes:

a display array 100 including a plurality of display portions 110, each display portion 110 including at least one display subportion; and a plurality of image detectors 200 configured to detect photosignals to obtain a target detection image.

The plurality of image detectors 200 may be adjacent to the plurality of display portions 110 and have first distribution positions and second distribution positions, where the first distribution positions are different from the second distribution positions. Here, the distribution position may indicate where each image detector 200 is disposed relative to the nearest display portion. For example, the first distribution position indicates a first position above the nearest display portion while the second distribution indicates a second position below the nearest display portion. In another example, the first distribution position indicates a first position above a first subpixel in the nearest display portion while the second distribution indicates a second position above a second subpixel in the nearest display portion.

The display portion may be a pixel portion configured to form a display picture. The plurality of display portions may form the display array in form of multiple rows and multiple columns. Different display portions may present different brightness to form the display picture to realize a display function of the display panel.

The display portion may further include at least one display subportion, and each display subportion may be a subpixel. Different display subportions of the same display portion may emit light in different colors, for example, three primary colors of colored light. A display picture with a colored effect may be formed by display subportions of different colors and brightness.

Gaps may be between the display portions of the display panel, i.e., at the adjacent positions of the display portions, and the image detectors may be arranged in these gaps. The image detectors may be configured to detect the photosignals, including photosignals of ambient light or a preset wavelength. The photosignals detected by the plurality of image detectors at different positions may be processed to generate the target detection image, thereby realizing an image detection function.

In an in-screen image acquisition product, image detectors, for example, light sensors and brightness sensors, may be arranged nearby pixel portions. Ambient photosignals may be acquired through a plurality of image detectors respectively and then synthesized into an acquired target detection image. Such a method may be applied to functions such as optical fingerprint acquisition and in-screen photographing. In some implementations, an OLED screen may be adopted to implement in-screen image detection, and the image detectors may be arranged in gaps beside each OLED pixel. In some other embodiments, an LCD may be adopted. However, the LCD may provide light energy through a backlight source. Overall transmittance, or called an aperture ratio, of the display screen may be one of important factors impacting the energy efficiency of the display screen.

The positions of the pixel portions generally may be arranged with a non-light-tight thin film, including an Indium Tin Oxide (ITO) thin film and a Color Filter (CF). However, the positions of non-pixel portions may be needed to be arranged with wirings, switching devices and the like, at which electrical interference from backlight is required to be reduced and thus a light-tight BM is required to be adopted for blocking light. If image detectors are to be arranged, the image detectors are needed to be arranged at the positions of the non-pixel portions. It can be seen that, if a region blocked by the BM is larger, the aperture ratio of the display screen is lower.

For improving the aperture ratio, an RGBW or Red Green Blue Yellow (RGBY) pixel layout, etc. may be adopted, and the pixels may be alternately laid out in different rows, so that the overall display brightness may be improved (the brightness is improved in case of fixed backlight brightness, or the backlight brightness may be reduced in case of the same display brightness).

When the image detectors are arranged, for facilitating wiring and layout of the switching devices, one image detector may usually be arranged for each pixel portion (including four RGBW subpixels), and may be arranged at the same position of the pixels. However, when RGBW or RGBY pixel layout is adopted instead of RGB pixel layout, if a size of a subpixel is kept unchanged, the pixel resolution may be reduced, and the number of pixels in a portion area may be reduced.

A Full High Definition (FHD) display screen is taken as an example. The RGB pixel layout may be adopted, namely each display portion includes three subpixels RGB, and meanwhile, the same pixel layout may be adopted for different rows. That is, the subpixels in the same column may be in the same color. In such case, the display resolution of the display panel may be about 400 dpi, and correspondingly, the detection resolution of the image detector may also be about 400 dpi. After the subpixels W are added, if an area of the subpixel is kept unchanged, both the display resolution and the detection resolution may be reduced to 300 dpi. However, such a resolution may not meet an image detection requirement. For example, a detection resolution for fingerprint detection is about 363 dpi.

If the manner that one image detector is arranged for each pixel portion is still adopted, the image acquisition resolution may be reduced, and the image acquisition quality may be impacted. For example, during fingerprint acquisition, if the resolution is low, fingerprint recognition may not be implemented, and a using effect may be degraded.

However, when the image detectors are laid out more densely but not laid out corresponding to the display pixels, the subpixels around each image detector may be different in color, resulting in the problems that the wirings of the image detectors are unreasonably arranged and thus impact the display pixels and the like. For example, if twice as many image detectors are arranged to improve the detection resolution to 600 dpi, for example, the RG subpixels correspond to an image detector and the BW subpixels correspond to an image detector, a circuit and a wiring space almost occupy the whole aperture, and the display brightness is reduced. Therefore, for the number of the image detectors, bigger does not mean better, and the display effect and the image detection requirement are required to be considered at the same time.

The problem above is not limited to the RGBW or RGBY pixel layout. For other pixel layouts, including RGB and RGW layout, etc., if the image detection resolution is required to be improved or the subpixels in different colors in adjacent rows are alternately distributed, there may be the same problem.

Therefore, it is proposed that the image detectors may be distributed at different distribution positions, namely distributed at different adjacent positions of the display portions in at least two different manners. A plurality of image detectors may be distributed at different distribution positions at the adjacent positions of the display portions. Herein, the first distribution positions and the second distribution positions may be different positions nearby the display portions. Herein, the adjacent position of a display portion refers to a gap between the display portion and another display portion nearby the display portion. If the display portion is at an edge of the display panel, the adjacent position may also include a position, other than the position of the display portion, at the edge of the display panel.

In an implementation, the image detector at the first distribution position may be in a first orientation of the display portion, and the image detector at the second distribution position may be in a second orientation of the display portion. For example, the image detector at the first distribution position is above the display portion, and the image detector at the second distribution position is below the same display portion. In some implementations, the orientations may be based on a display direction of the display panel, for example, "upper and lower sides of a display picture", and "left and right" defined based on a direction of a viewer when the viewer faces the display panel. However, "above", "below" and the like are adopted herein not to limit a direction of a practical product but only to represent relative positions and directions.

It is to be noted that both the first distribution position and the second distribution position are based on the same display portion herein. For example, an image detector at a first distribution portion is above a display portion, and correspondingly, the image detector at a second distribution portion is below the display portion. In such a manner, the display panel may be formed by laying out multiple combinations of display portions and image detectors distributed in form of an array. For a display panel, the abovementioned combinations may be adopted for part of display portions only, and only image detectors at first distribution positions may be distributed nearby the other part of display portions or only image detectors at second distribution positions may be distributed nearby the other part of display portions. Therefore, a practical distribution of the edge or different regions of the display panel may be determined according to a combination of the display portions and the image detectors and an overall layout of the display portions.

In some implementations, the first orientation and the second orientation may be opposite orientations of the display portion. In some other embodiments, the first orientation and the second orientation may be two adjacent orientations of the display portion. Like the abovementioned explanations about the orientations, the opposite orientations and the adjacent orientations may also be described relative to the same display portion and the orientations may be based on the display portion of the display panel. For example, two orientations of being above and below a display portion may be referred as opposite orientations, and a left upper corner and right upper corner of a display portion may be referred as adjacent orientations.

In such a manner, the image detectors may be arranged in different position spaces around the display portions respectively, not limited to the arrangement manner of one-to-one correspondence between the image detectors and the display portions. Therefore, there may be a plurality of image detectors at the adjacent positions of the same display portion, and the resolution of the image detectors may be higher than the resolution of the display portions. A higher image detection resolution may be achieved even for a display panel with a low requirement on a resolution of a display picture.

In some implementations, the first distribution positions may be the adjacent positions of each display portion in the same direction, for example, positions between the display portions of two rows. Therefore, each display portion may correspond to an image detector. In addition, the image detectors at the second distribution positions may also be distributed. The second distribution positions may be the adjacent positions of part of display portions in the same direction, for example, besides the first distribution positions. The first distribution position and the second distribution position may be understood as positions above the left and right (below the left and right, etc.) of the same display portion. Therefore, different image detection resolutions may be achieved according to the image detectors at the second distribution positions.

Figure 5B:
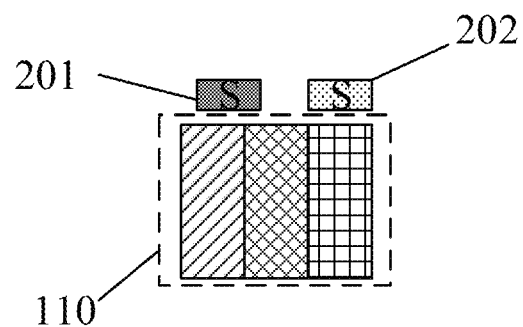
FIG. 5B is a schematic diagram illustrating a position relationship between display portions and image detectors according to an example.

Here, as shown in FIG. 5B, the first distribution position 201 is above the left of the display portion 110, namely there is an image detector S above the left of the display portion. Meanwhile, the second distribution position 202 is above the right of the display portion, namely there is an image detector S above the right of the display portion. For the whole display panel, there may be image detectors at the first distribution positions 201 and the second distribution positions 202 for all the display portions, so that the resolution of the image detectors is twice the display resolution.

Figure 5C:
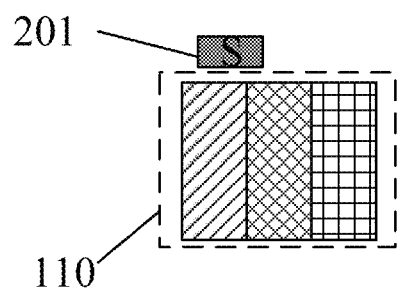
FIG. 5C is a schematic diagram illustrating another position relationship between display portions and image detectors according to an example.
Figure 5D:
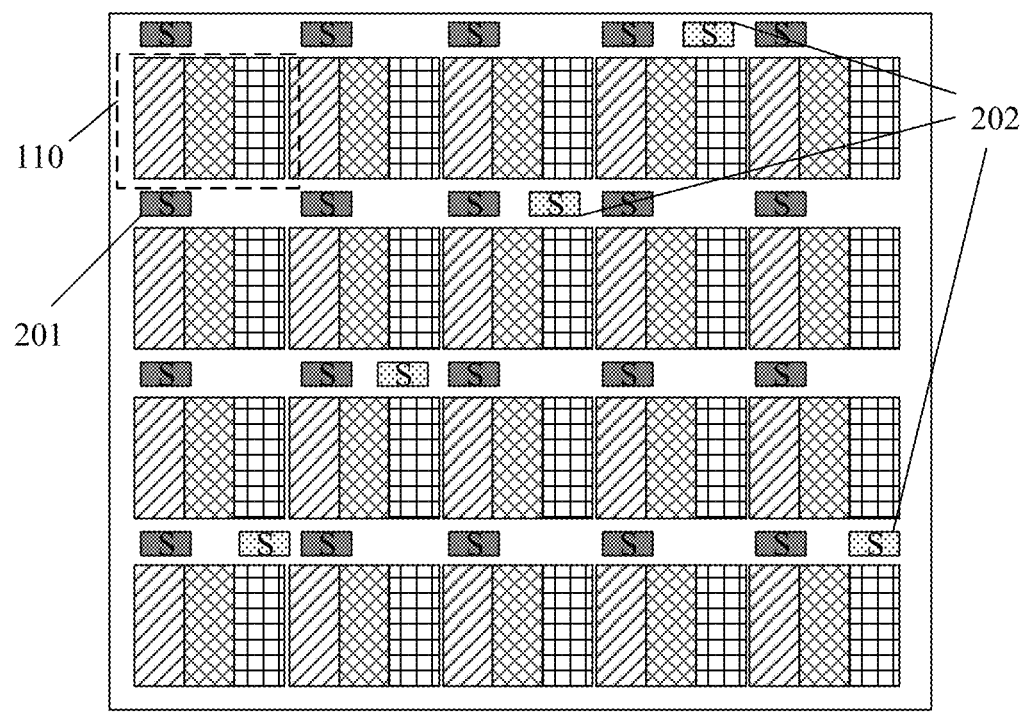
FIG. 5D is a schematic diagram illustrating distribution of display portions and image detectors according to an example.

Considering arrangement of too many image detectors may further reduce the aperture ratio or increase the process complexity, the number of image detectors may also be appropriately reduced. Two different combinations of the display portions and the image detectors may be adopted for the same display panel, for example, a combination shown in FIG. 5C, namely there is only an image detector S at the first distribution position 201 for the display portion 110. For example, there is an image detector above each display portion, and meanwhile, an image detector is arranged at the second distribution position, namely below the display portion at an interval of three display portions in a row. That is, combinations, shown in FIG. 5B, of the display portions and the image detectors are arranged at an interval of three combinations, shown in FIG. 5C, of the display portions 110 and the image detectors S to form a layout shown in FIG. 5D. In such a manner, the resolution of the image detectors is about 1.25 times the display resolution. It is to be noted that "at the interval of three" is not limited to the specific display portion in the display panel and is only adopted to represent a distribution rule of all the display portions and image detectors in the display panel. Therefore, a specific layout of the display portions at positions such as the edge of the display panel or boundaries of different regions may be determined according to a practical requirement and is not limited herein.

Accordingly, different types of distribution positions may be set to make the numbers of the image detectors and the display portions different and increase the number of the image detectors to conveniently control the resolution of the image detectors and meet different using requirements.

Figure 6:
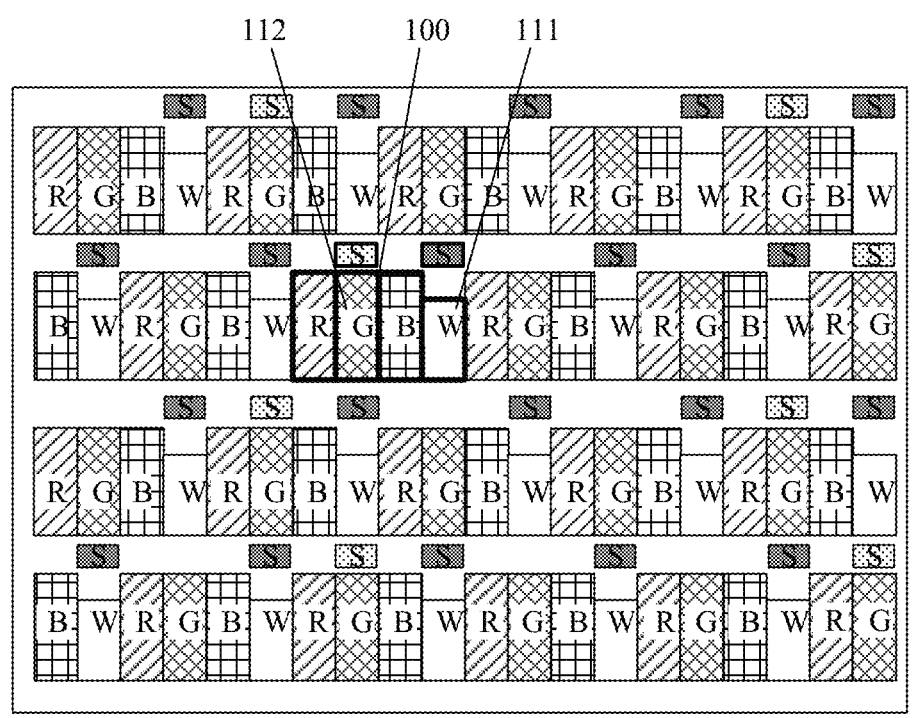
FIG. 6 is a schematic diagram illustrating distribution positions of image detectors in a display panel according to an example.

In some implementations, as shown in FIG. 6, at least part of the plurality of display portions in the display array include first color display subportions. Each display portion may include at least one second color display subportion different from the first color display subportion. The first color display subportions in the display portions in adjacent rows may be in different columns respectively.

The first distribution positions may be above the first color display subportions respectively 111.

The second distribution positions may be above at least part of the second color display subportions 112.

Herein, the position above (and the corresponding position below) refers to a position relationship when the image detector and the display subportion are projected onto a plane that is the display panel. When a viewer faces the display panel, a position relationship between an image detector and a display subportion projected onto the display panel may be a vertical relationship for the viewer, namely the first distribution positions are above the first color display subportions and the second distribution positions are above at least part of the second color display subportions.

For convenient understanding, descriptions are made herein with the display portion 100 boxed with bold lines in FIG. 6 as an example. An image detector S, i.e., an image detector at the first distribution position, may be arranged above the first color display subportion 111 on the rightmost side of the display portion 100, and another image detector S, i.e., an image detector at the second distribution position, may be arranged above the second color display subportion 112 (for example, the green display subportion G in the figure) of the display portion 100. Such a combination is called a one-to-two combination of the display portion and the image detectors herein. For the whole display panel, there may be a plurality of one-to-two combinations of the display portions and the image detectors. In addition, the same display panel may further include a plurality of one-to-one combinations of the display portions and the image detectors (a display portion corresponds to only one image detector at the first distribution position or the second distribution position). For example, for the first display portion in the upper left corner, there is no image detector above the second color display subportion but an image detector S above the first color display subportion W only. After such different combinations form the display array in the display panel, a layout shown in FIG. 2 may be presented.

The first color display subportion or the second color display subportion may be a display subportion in any color in the display portion, or may also be a display subportion occupying a smaller area or a display subportion with a larger gap around, etc. In a practical application, the first color display subportion may be selected according to a layout characteristic of the display pixels.

Therefore, the image detectors may be distributed respectively on the display panel according to a rule that the two distribution positions are fixed, so that data statistics and processing may be facilitated in a signal acquisition process.

In some implementations, each image detector at the second distribution position in a non-display edge region may be below the first color display subportion;

a distance between a first end of each image detector at the first distribution position and the first color display subportion may be a first distance;

a distance between a first end of each image detector at the second distribution position and the first color display subportion may be a second distance; and the first distance may be equal to the second distance.

For ensuring that the image detectors at the first distribution positions and the second distribution positions are in the same environment, first image detectors and second image detectors may be arranged at approximately the same distances away from the first color display subportions. Since each image detector has the same physical structure, the distance between each image detector and the second color display subportion may also be approximately the same. That is, the image detector at any distribution position may be subjected to interference of the same display light.

Figure 7:
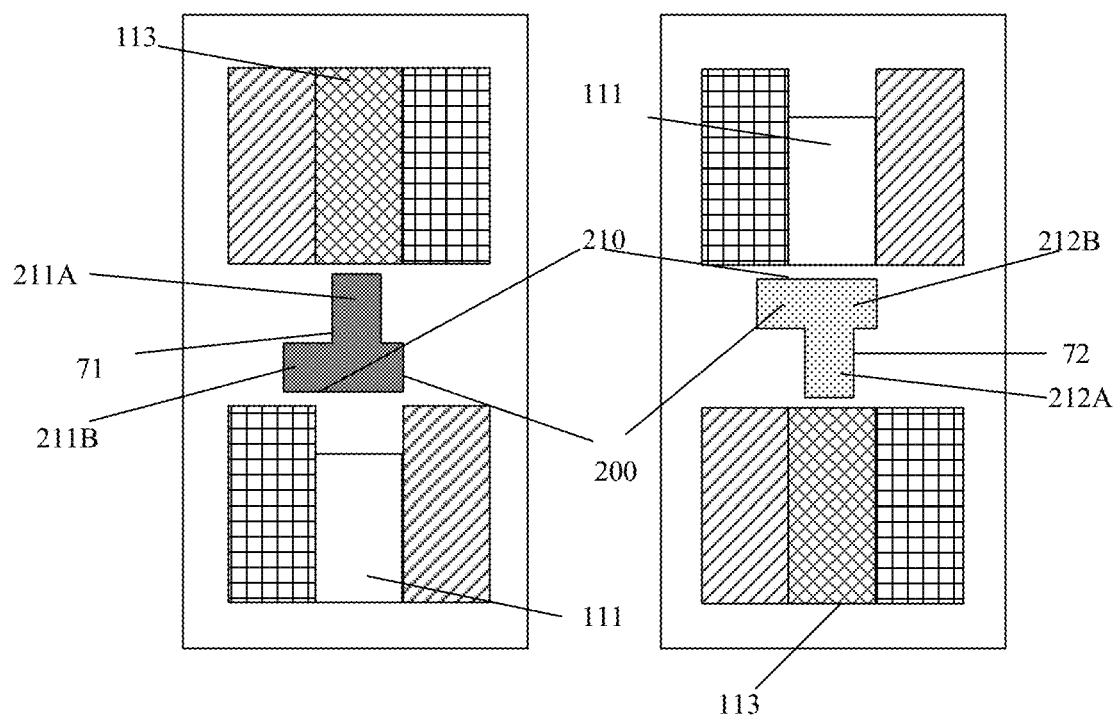
FIG. 7 is a schematic diagram illustrating distribution directions of image detectors in a display panel according to an example.

As shown in FIG. 7, edges, adjacent to the first display subportions 111, of the image detectors 200 at the first distribution position and the second distribution position are the same edges 210 of the same parts of the image detectors. The non-display edge region is a region between the first row of display portions and the last row of display portions of the display panel.

Herein, the same part refers to a part having the same structure in the physical structure of the image detector. All the image detectors at the first distribution positions and the second distribution positions practically may have the same physical structures, for example, having the same switching devices, sensing devices and circuit wirings. For example, a first image detector 71 is disposed at a first distribution position below a green subpixel 113 and above and a white subpixel 111 while a second image detector 72 is disposed at the second distribution position below a white subpixel 111 and above a green subpixel, where the first end 211A of the first image detector 71, close to the green display subpixel, and the second end 212A of the second image detector 72 have the same structures. Similarly, the end 211B of the first image detector 71 and the end 212B of the second image detector 72 have same structures of the image detectors.

In some implementations, the image detector may be in a regular shape, for example, a symmetric structure such as a cube or a sphere.

In some other embodiments, for facilitating layout of the image detectors and various switching devices, wirings and the like in the display screen, the image detectors are not always shaped into symmetric structures such as squares, rectangles or rounds but are distributed on the display panel in irregular shapes, as shown in FIG. 7. Considering probable interference from the display portions around the image detectors to the signals acquired by the image detectors, it is necessary to eliminate data changes brought by the interference by operation and the like during data processing.

If directions of the image detectors are not considered, the two types of image detectors may be arranged asymmetrically and the image detectors distributed in two different manners may be subjected to different ambient interference, which increases difficulties in data processing. Therefore, as shown in FIG. 7, an orientation of each edge of the image detector 200 may be changed herein to ensure that the same edge of each image detector 200 is closest to the same display subportion to further ensure that each image detector 200 is subjected to substantially the same ambient interference. The image detectors at the display edge, for example, the image detectors above the display portions of the first row, may be all adjacent to the display portions of the first row only, so that an environment around the image detectors of the first row may be different from an environment around the image detectors in the non-display edge region. However, the overall effect may be impacted a little if only the edge of the whole display panel is involved, therefore, when the image detectors at the edge are laid out according to the same rule for the non-edge region, it is also unnecessary to consider whether there are subpixels in all colors or not around.

When the image detectors are arranged in the display panel, the image detectors may usually be arranged in part of regions in the display panel. In such case, there may be no image detectors at the display edge, and thus it is unnecessary to consider edge data processing problems.

In such a manner, the display subportions around image sensors at different distribution positions may be the same in color, so that image detection differences brought by different distribution manners may be reduced, and detection data post-processing may be facilitated.

In some implementations, the first color display subportion may be a white display subportion; the second color display subportion may be a unicolor or multicolor display subportion; and in each of the plurality of display portions, a length of the first color display subportion may be less than a length of the second color display subportion.

Herein, the color display subportion may be set according to the display requirement of the display screen. For example, for a full-color display screen, the three primary colors RGB of the colored light may be adopted to form a colored display picture. For improving the aperture ratio, display pixels W may be added, namely RGBW display pixel arrangement may be adopted, or display pixels Y may be added, namely another display pixel distribution design such as RGBY may be adopted. Each display portion may include four display subportions in different colors respectively.

In the embodiments, the white display subportion may be taken as the first color display subportion. An area of the white display subportion may be different from an area of a color display subportion. For example, an area ratio of each display subportion of RGBW may be 1:1:1:0.75, and based on such an area ratio, a better visual effect and an adequate aperture ratio may be achieved. The length of the white display subportion may be set to be less than the length of the second color display subportion to achieve different area ratios.

Since the area of the first color display subportion, i.e., the white display subportion, is relatively small, a gap around the first color display subportion may be relatively large, and there may be an efficient space for arrangement of the image detector at the first distribution position. Since the image detector at the second distribution position is adjacent to the other side of the first color display subportion, the relatively small area of the first color display subportion may also facilitate arrangement of the image detector at the second distribution position.

Figure 8A:
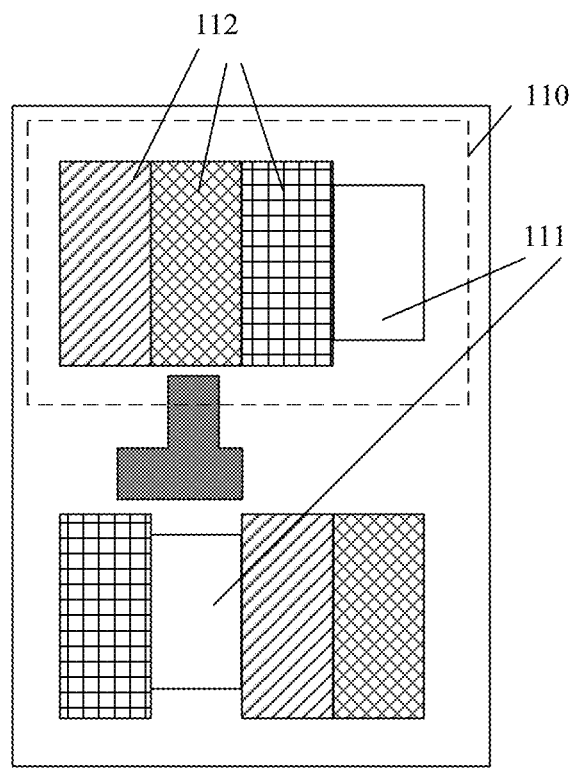
FIG. 8A is a first schematic diagram illustrating distribution of each display subportion in a display portion according to an example.
Figure 8B:
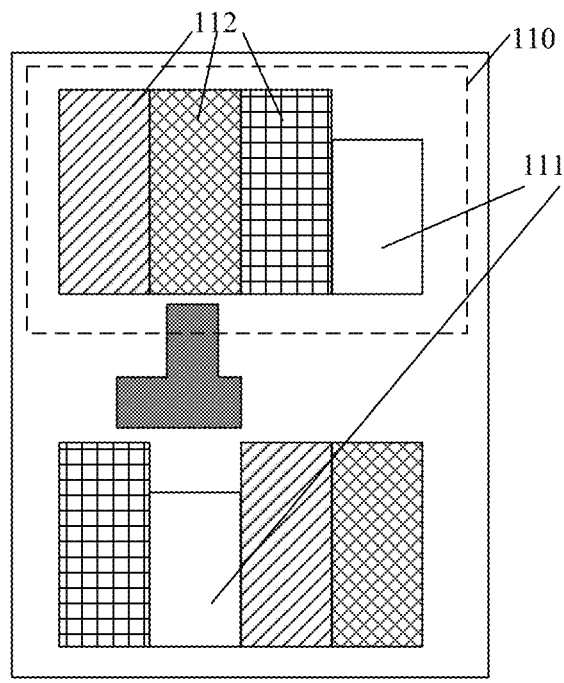
FIG. 8B is a second schematic diagram illustrating distribution of each display subportion in a display portion according to an example.

In some implementations, as shown in FIG. 8A, in the same display portion 110, central points of the first color display subportion 111 and the second color display subportion 112 may be aligned on a first straight line; or, as shown in FIG. 8B, in the same display portion 110, bottom edges of the first color display subportion 111 and the second color display subportion 112 may be aligned on a second straight line.

The display portions may be laid out row by row and column by column, and centers of each display subportion in each display portion may be connected into a straight line to ensure that upper and lower edges of the white display subportion in each display portion are at the same distances away from another display portions. When the image detectors at the first distribution positions and the image detectors at the second distribution positions are arranged, there may be two image detectors that are centrosymmetric about the center of the first color display subportion above and below the first color display subportion respectively. Therefore, the environments around the image detectors at the two types of distribution positions may be more consistent.

For convenient arrangement of the display portions, the bottom edges of the first color display subportion and the second color display subportion may also be aligned on the same straight line. A specific arrangement manner may also be regulated according to a requirement of the product during the practical application, and there is only provided an exemplary arrangement manner herein.

In some implementations, as shown in FIG. 6, the second color display subportion includes a red display subportion, a green display subportion and a blue display subportion.

The display panel may include:

display portion rows formed by the first color display subportions and second color display subportions that are laid out in a first sequence, the first sequence being the red display subportion, the green display subportion, the blue display subportion and the white display subportion, and display portion rows formed by the first color display subportions and second color display subportions that are laid out in a second sequence, the second sequence being the blue display subportion, the white display subportion, the red display subportion and the green display subportion.

The display portion rows laid out in the first sequence and the display portion rows laid out in the second sequence may be alternately laid out as odd and even rows.

In the display panel, the image detectors at the first distribution positions may be above each white display subportion, and the image detectors at the second distribution positions may be above the green display subportions at an interval of three white display subportions in each display portion row.

Figure 9:
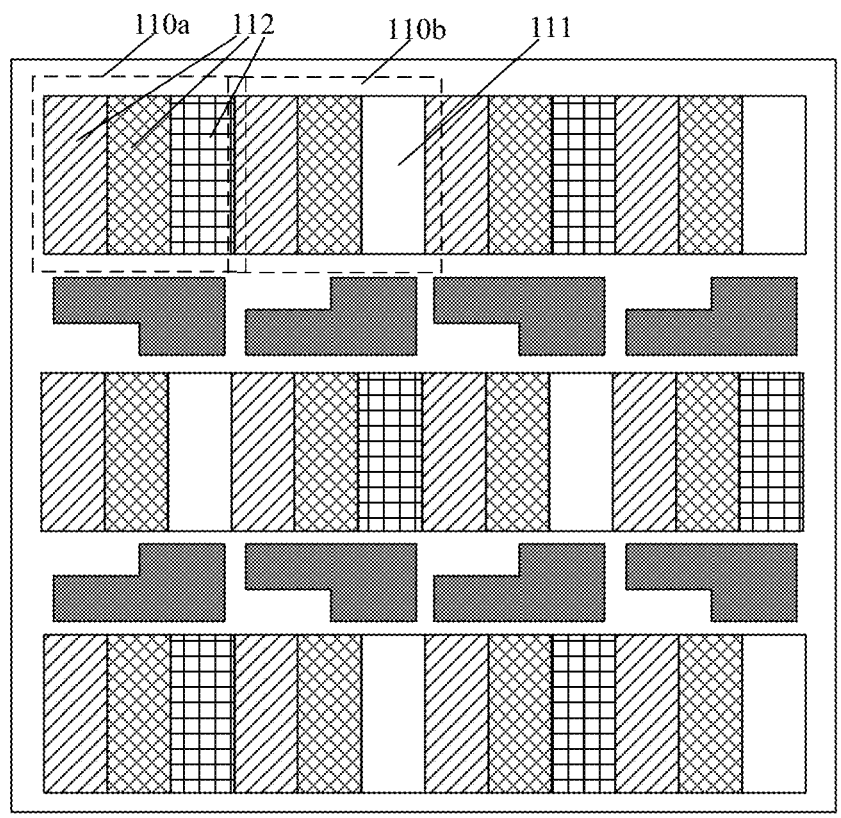
FIG. 9 is a structure diagram of a display portion according to an example.

In some implementations, as shown in FIG. 9, the display portion 110 includes:

a first-type display portion 110a and a second-type display portion 110b.

The first-type display portion 110a may include the second color display subportion 112.

The second-type display portion 110b may at least include the first color display subportion 111 and the second color subportion 112.

The first color display subportion 111 may be the white display subportion and the second color display subportion 112 may be a unicolor or multicolor display subportion.

The essence of the layout shown in FIG. 9 is that each display portion corresponds to an S and each S is relatively far from the white subpixel portion. The distribution manner of the image detectors may be applied to different pixel layouts to implement full utilization of the pixel gaps and simultaneously ensure the detection resolution of the image detectors.

In some implementations, the second-type display portion may include:

the red display subportion, the green display subportion and the white display subportion.

Based on such a design, blue light may be reduced, meanwhile, the overall brightness may be increased, and the aperture ratio is improved. In addition, the resolution of the pixel may not be reduced too much. Under this structure, arranging the image detectors according to the adjacent positions of the white display subportions respectively may also reduce resolution reduction of the image detectors and ensure both the display effect and the image detection accuracy.

In some implementations, as shown in FIG. 9, the display panel may include that:

in the first-type display portion, the second color display subportions are laid out in a third sequence, the third sequence being the red display subportion, the green display subportion and the blue display subportion;

in the second-type display portion, the first color display subportions and the second color display subportions are laid out in a fourth sequence, the fourth sequence being the red display subportion, the green display subportion and the white display subportion;

the first-type display portions and the second-type display portions are alternately laid out in the same display portion row and alternately arranged in the same display portion column; and the image detectors at the first distribution positions and the image detectors at the second distribution positions are alternately distributed in each row, and the first ends of the image detectors are relatively close to the first-type display portions and relatively far from the second-type display portions.

The first end refers to one end of the physical structure of the image detector in practice. The first end of each image detector may be the same structural part, and the structural part herein may be any part of the image detector, for example, a part where the sensing device of the image detector is located or any edge part (for example, circuit wiring) of the image detector, so that the same structural part may refer to the sensor or the circuit wiring, etc. That is, distances of the image detector at the first distribution position and the image detector at the second distribution position far away from the first-type display portion may be the same, and may be called distances to the first-type display portion; and distances between the image detector at the first distribution position and the image detector at the second distribution position far away from the second-type display portion may also be the same, and may be called distances to the second-type display portion herein.

Moreover, the distance to the first-type display portion may be shorter than the distance to the second-type display portion. That is, the first end of each image detector may be relatively close to the first-type display portion and relatively far from the second-type display portion.

In some implementations, the display panel may further include:

a first transparent substrate, and a second transparent substrate, arranged opposite to the first transparent substrate and serving as a display surface of the display panel, the display array being between the first transparent substrate and the second transparent substrate.

BMs isolating different display subportions may be further distributed between the first transparent substrate and the second transparent substrate.

The image detectors may be arranged on the BMs and face the second transparent substrate.

Herein, the first transparent substrate and the second transparent substrate may be arranged opposite to each other, the display portions may be distributed therebetween; a display driving circuit, liquid crystals, pixel switches and other related elements may be included, and the image detectors and related circuit wirings thereof may be further included. The first transparent substrate may be a substrate configured to bear the display driving circuit, the pixel switches and other circuit elements, for example, a TFT substrate. In addition, the image detectors may also be arranged on the first transparent substrate. The second transparent substrate, arranged opposite to the first transparent substrate, may be a substrate configured to bear, for example, CFs corresponding to the display portions, thereby forming color pixels with TFTs, and may serve as the display surface of the display panel.

Various electrical elements may be arranged on the first transparent substrate. For reducing impact of the backlight source on the performance of these electrical elements, the first transparent substrate may be coated with the BM, the electrical elements may be arranged on the BM, and then the BM may block light between the backlight source and the electrical elements.

Since the image detector is a photosensitive device and may be impacted by the ambient light, the image detector may also be arranged on the BM for reducing the impact from the backlight source to the image detector. Or, a position where the image detector is required to be arranged may be coated with a layer of BM as a photoresist, and then the related elements of the image detector may be formed on the BM. The BM may be formed by a non-light-tight thin film only without any complex structure such as a circuit, and a shape and position thereof may be conveniently regulated, so that bearing the image detectors with the BM may bring convenience to design and manufacturing and may also reduce the impact of the backlight source and the like to the image detectors.

Therefore, the image detectors in the embodiment may be applied to an LCD to ensure the aperture ratio of the display panel, simultaneously ensure an adequate image detection resolution and accuracy and improve the image detection effect.

In some implementations, the display panel may further include:

a detection image processor, configured to generate the target detection image according to the photosignals detected by the plurality of image detectors and position information of each of the plurality of image detectors distributed on the display panel.

The plurality of image detectors may be distributed at different positions of the display panel, and each image detector is configured to detect the photosignal corresponding to a part of the image. The image detectors may be distributed at two different types of distribution positions and thus may wholly be prevented from being distributed irregularly or non-uniformly. Therefore, during detection data processing, the target detection image may be generated with taking position information of each image detector into consideration. That is, an information component provided by each image detector in the generated target detection image is required to depend on a practical position, so that a correct detection image may be obtained even if the image detectors are not distributed according to a rule.

In some implementations, the image detector may include:

an emitting element, configured to emit detection light;

a receiving element, configured to receive reflected light returned based on an action of the detection light on a detection target; and an imaging element, connected with the receiving element and configured to generate the target detection image based on the reflected light, the target detection image including a fingerprint image.

The image detector may utilize the reflected light for imaging and may emit the detection light out of the display panel through the emitting element. When the display panel is covered with a finger, the finger may reflect the detection light back into the display panel for the receiving element to receive light. Since the photosignals reflected by different positions of a fingerprint of the finger are different, the imaging elements may recover lines of the fingerprint according to the reflected light received by the plurality of image detectors, thereby forming the fingerprint image.

In some implementations, the image detector may include one or more of following: an image detector for fingerprint detection, an image detector for vein detection, a camera. The camera may be a front camera and may acquire visible or invisible portrait or object image, etc.

The embodiments of the present disclosure may provide the following examples.

Figure 10:
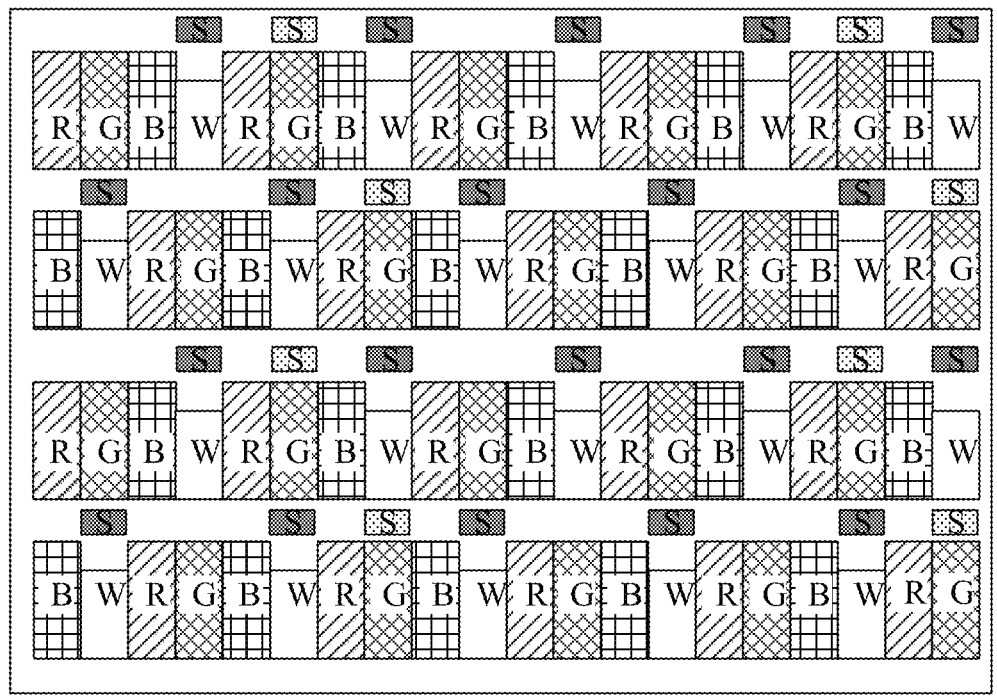
FIG. 10 is a schematic diagram illustrating layout of pixels and photosensors of a display panel according to an example.

A distribution manner is proposed as shown in FIG. 10. A photosensor S is arranged above each W pixel, and R (upper left and right lower), G (upper), B (left lower and right upper) and W (lower) are distributed around the photosensor S. Then, a photosensor S above the G pixel (below the W pixel) may be added after every three pixel cycles, and pixels RGBW may also be distributed around the photosensor S: R (left lower and right upper), G (lower), B (left upper and right lower) and W (upper). Therefore, environments around each photosensor may be consistent, and the resolution of the photosensor may also reach 400 dpi.

Figure 11:
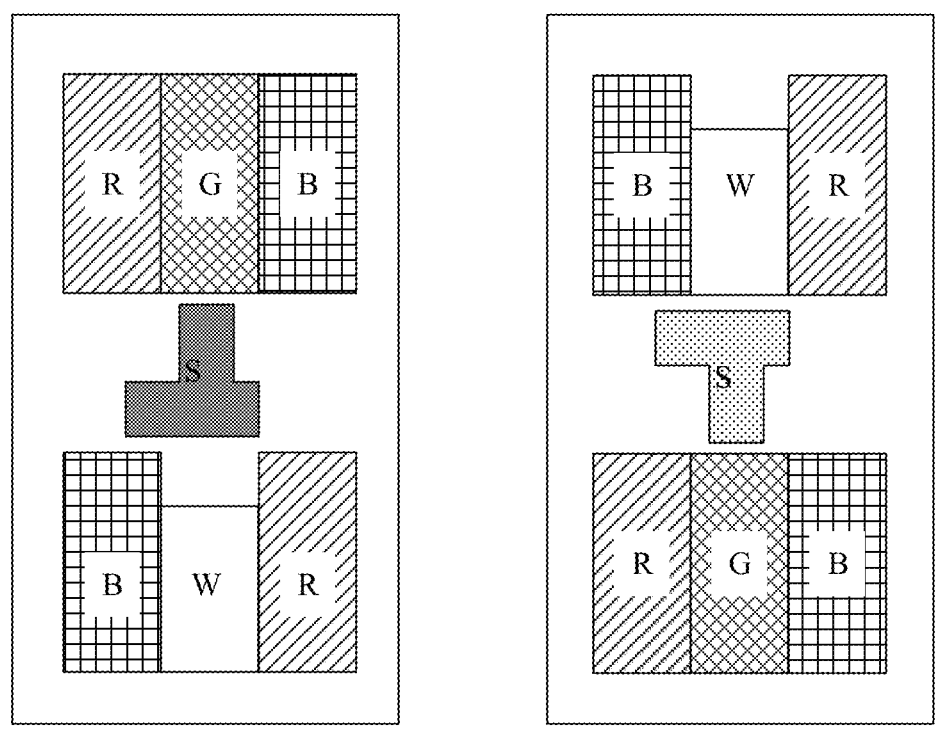
FIG. 11 is a first schematic diagram illustrating arrangement of pixels and photosensors of a display panel according to an example.

Since different environments are observed by such special photosensors as shown in the figure, directivity is required to be considered when the photosensor is designed. As shown in FIG. 11, designs and layouts of the two photosensors S and the circuits are symmetric and inverted, and a shape of the photosensor, a solution for blocking stray light in a box and the like are designed symmetrically.

Figure 12:
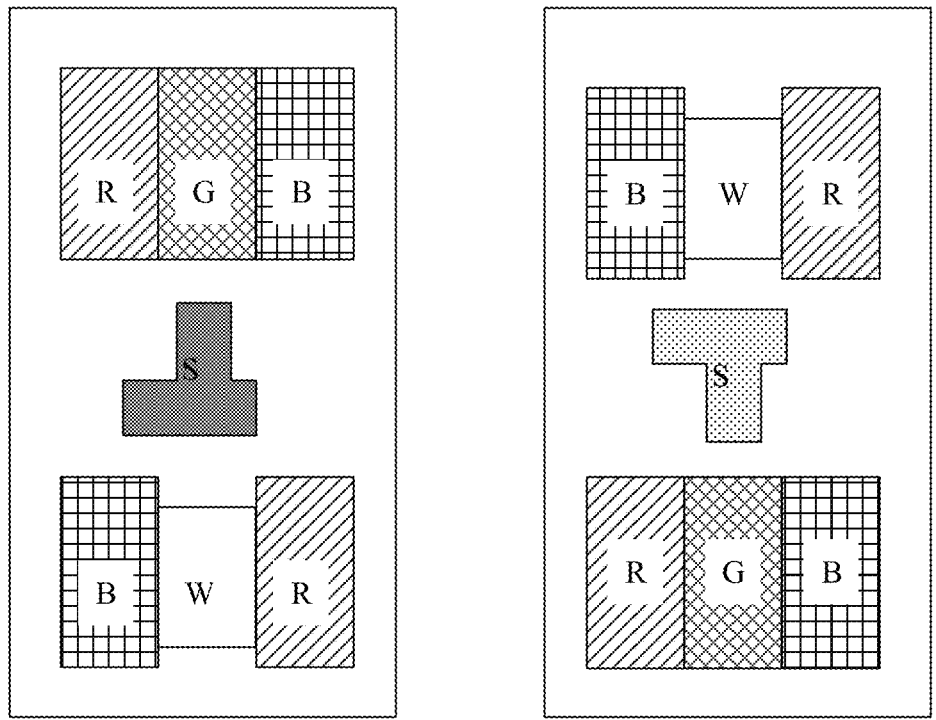
FIG. 12 is a second schematic diagram illustrating arrangement of pixels and photosensors of a display panel according to an example.

In addition, it can also be seen from FIG. 11 that the distances between the white parts W and the photosensors S are inconsistent, so that pixel designs may be finely regulated as shown in FIG. 12, namely the W pixels are regulated towards the middle part to be symmetric to make differences of the environments around each photosensor S smaller.

During the practical application, the photosensor and the circuit may not be completely symmetric. In such case, the photosensor and impact of the stray light may be mainly considered and the circuit may be arranged at another part and then connected through a wire, or the photosensor may be superposed on the circuit to reduce a used space.

Figure 13:
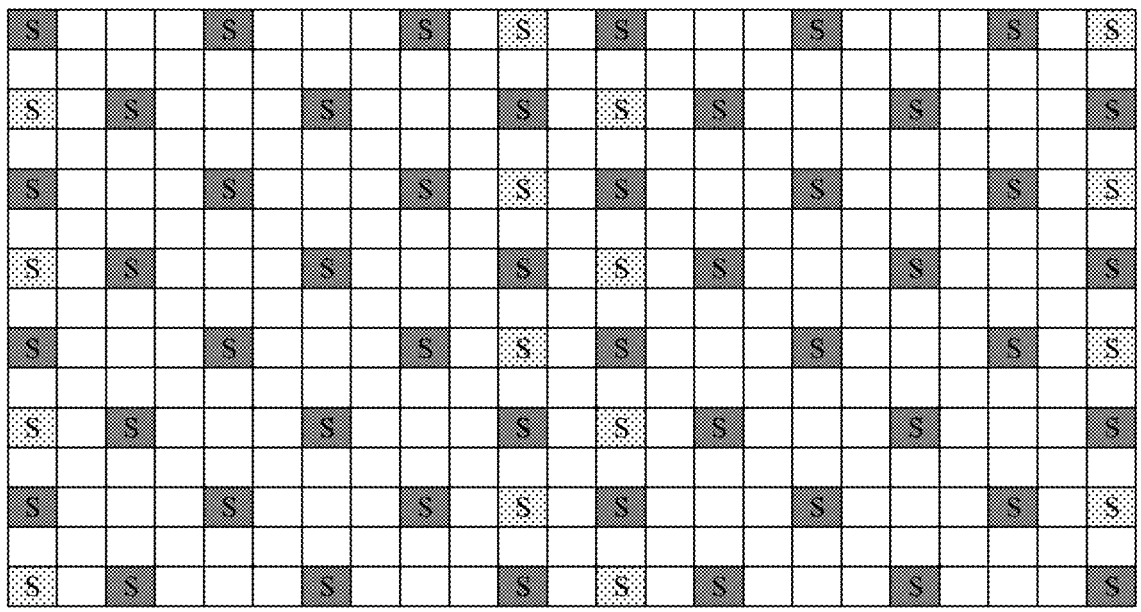
FIG. 13 is a schematic diagram illustrating distribution of photosensors of a display panel according to an example.

After all the photosensors S are designed in such a manner, a form shown in FIG. 13 may be presented, namely there may be an interlacing condition for image acquisition. Therefore, during data processing, data processing and regulation may be performed according to the distribution rule of the photosensors S with the positions of the photosensors S being considered to obtain a practical detection image.

Figure 14:
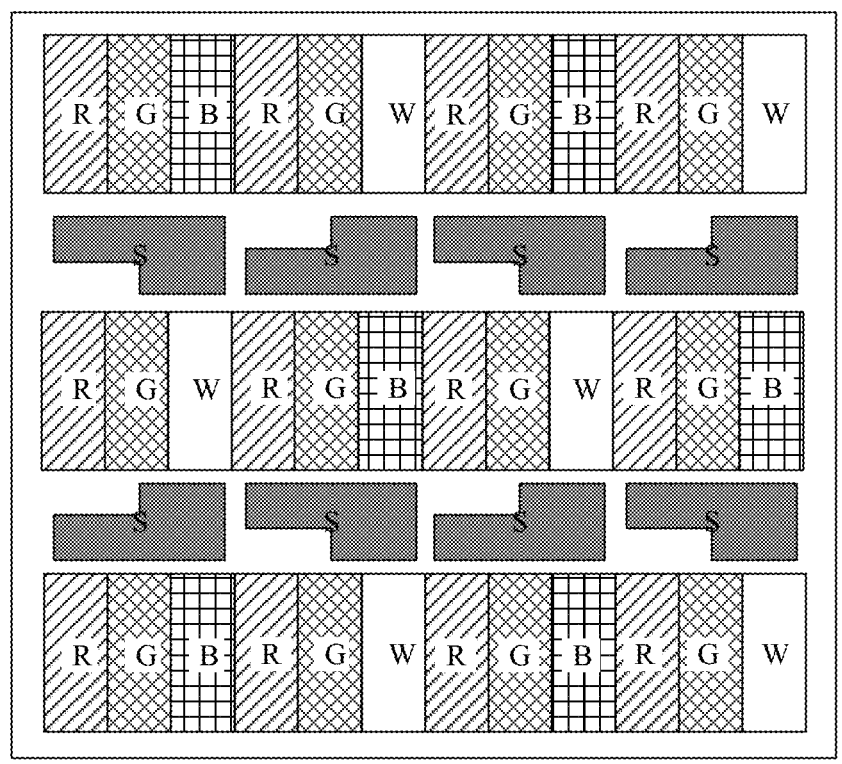
FIG. 14 is a schematic diagram illustrating another layout of pixels and photosensors of a display panel according to an example.

In addition, the abovementioned idea may also be applied to other pixel layouts. As shown in FIG. 14, arrangement directions of the photosensors corresponding to different pixels are different, so that the environments around each photosensor are consistent.

Figure 15:
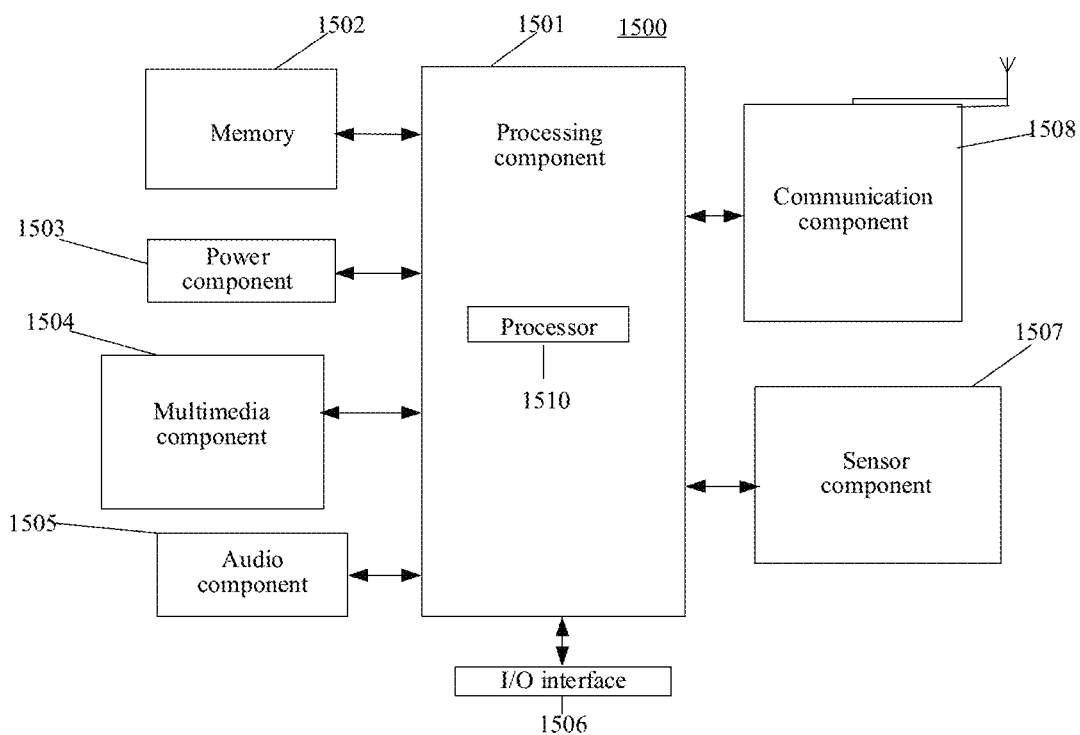
FIG. 15 is a physical structure block diagram of a terminal device according to an example.

FIG. 15 is a physical structure block diagram of a terminal device 1500 including any display panel in the abovementioned embodiments. In an example, the device 1500 may be a mobile phone, a computer, a digital broadcast terminal, a messaging device, a gaming console, a tablet, a medical device, exercise equipment, a personal digital assistant and the like.

Referring to FIG. 15, the device 1500 may include one or more of the following components: a processing component 1501, a memory 1502, a power component 1503, a multimedia component 1504, an audio component 1505, an Input/Output (I/O) interface 1506, a sensor component 1507, and a communication component 1508.

The processing component 1501 is typically configured to control overall operations of the device 1500, such as the operations associated with display, telephone calls, data communications, camera operations, and recording operations. The processing component 1501 may include one or more processors 1510 to execute instructions to perform all or part of the steps in the abovementioned method. Moreover, the processing component 1501 may further include one or more modules which facilitate interaction between the processing component 1501 and other components. For instance, the processing component 1501 may include a multimedia module to facilitate interaction between the multimedia component 1504 and the processing component 1501.

The memory 1510 is configured to store various types of data to support the operation of the device 1500. Examples of such data include instructions for any applications or methods operated on the device 1500, contact data, phonebook data, messages, pictures, video, etc. The memory 1502 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1503 may provide power for various components of the device 1500. The power component 1503 may include a power management system, one or more power supplies, and other components associated with generation, management and distribution of power for the device 1500.

The multimedia component 1504 may include a screen providing an output interface between the device 1500 and a user. In some implementations, the screen may include an LCD and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some implementations, the multimedia component 1504 includes a front camera and/or a rear camera. The front camera and/or the rear camera may receive external multimedia data when the device 1500 is in an operation mode, such as a photographing mode or a video mode. Each of the front camera and/or the rear camera may be a fixed optical lens system or have focusing and optical zooming capabilities.

The audio component 1505 is configured to output and/or input an audio signal. For example, the audio component 1505 includes a Microphone (MIC), and the MIC is configured to receive an external audio signal when the device 1500 is in the operation mode, such as a call mode, a recording mode and a voice recognition mode. The received audio signal may further be stored in the memory 1510 or sent through the communication component 1508. In some implementations, the audio component 1505 further includes a speaker configured to output the audio signal.

The I/O interface 1506 may provide an interface between the processing component 1501 and a peripheral interface module, and the peripheral interface module may be a keyboard, a click wheel, a button and the like. The button may include, but not limited to: a home button, a volume button, a starting button and a locking button.

The sensor component 1507 may include one or more sensors configured to provide status assessment in various aspects for the device 1500. For instance, the sensor component 1507 may detect an on/off status of the device 1500 and relative positioning of components, such as a display and small keyboard of the device 1500, and the sensor component 1507 may further detect a change in a position of the device 1500 or a component of the device 1500, presence or absence of contact between the user and the device 1500, orientation or acceleration/deceleration of the device 1500 and a change in temperature of the device 1500. The sensor component 1507 may include a proximity sensor configured to detect presence of an object nearby without any physical contact. The sensor component 1507 may also include a light sensor, such as a Complementary Metal Oxide Semiconductor (CMOS) or Charge Coupled Device (CCD) image sensor, configured for use in an imaging application. In some implementations, the sensor component 1507 may also include an acceleration sensor, a gyroscope sensor, a magnetic sensor, a pressure sensor or a temperature sensor.

The communication component 1508 is configured to facilitate wired or wireless communication between the device 1500 and another device. The device 1500 may access a communication-standard-based wireless network, such as a Wireless Fidelity (WiFi) network, a 2nd-Generation (2G) or 3rd-Generation (3G) network or a combination thereof. In an example, the communication component 1508 receives a broadcast signal or broadcast associated information from an external broadcast management system through a broadcast channel. In an example, the communication component 1508 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology or another technology.

According to the technical solutions of the embodiments of the present disclosure, a plurality of image detectors may be distributed at different positions adjacent to a plurality of display portions of a display array. In such a manner, gaps between the display portions may be reasonably utilized. When a high image detection resolution is required, the image detectors may be arranged at different types of distribution positions without impacting distribution of display pixels, so that adequate image detectors may be distributed in the display panel to further obtain the target detection image meeting a resolution requirement.

For example, when the display resolution is reduced from 400 Dots Per Inch (dpi) to 300 dpi due to the Red Green Blue White (RGBW) pixel layout and if the image detectors are distributed at positions relatively unified with each display portion, the image detection resolution may also be 300 dpi and may not meet the detection requirement.

Image detectors may be distributed at different distribution positions of display portions respectively. For example, there is an image detector at the first distribution position of each display portion, and meanwhile, there are also image detectors at the second distribution positions of part of display portions. In such a manner, a detection resolution of the image detector can be 300 dpi to 600 dpi, so that an image detection resolution meeting the requirement is achieved.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the apparatus or system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A display panel, comprising:
a display array comprising a plurality of display portions, where each of the plurality of display portions comprises at least one display subportion; and
a plurality of image detectors disposed adjacent to the plurality of display portions, configured to detect photosignals to obtain a target detection image,
wherein the plurality of image detectors have first distribution positions and second distribution positions, the first distribution positions being different from the second distribution positions,
wherein at least part of the plurality of display portions in the display array comprise first color display subportions; each of the plurality of display portions comprises at least one second color display subportion different from the first color display subportion; the first color display subportions of the display portions in adjacent rows are in different columns respectively;
the first distribution positions are respectively above the first color display subportions; and
the second distribution positions are respectively above only part of the second color display subportion,
wherein each image detector at the second distribution position in a non-display edge region is below the first color display subportion only,
wherein for each row of the display array, image detectors are placed in only two combinations; one type of the combinations is a one-to-two combination in which one display portion corresponds to one image detector at the first distribution position and to one image detector at the second distribution position, and the other type of the combinations is a one-to-one combination in which one display portion corresponds to one image detector either at the first distribution position or at the second distribution position.

2. The display panel of claim 1, wherein
a distance between a first end of each image detector at the first distribution position and the first color display subportion is a first distance;
a distance between a first end of each image detector at the second distribution position and the first color display subportion is a second distance; and
the first distance is equal to the second distance.

3. The display panel of claim 1, wherein the first color display subportion is a white display subportion;
the second color display subportion is a unicolor or multicolor display subportion; and
in each of the plurality of display portions, a length of the first color display subportion is less than a length of the second color display subportion.

4. The display panel of claim 3, wherein
in each of the plurality of display portions, central points of the first color display subportion and the second color display subportion are on a first straight line; or,
in each of the plurality of display portions, bottom edges of the first color display subportion and the second color display subportion are on a second straight line.

5. The display panel of claim 4, wherein the second color display subportion comprises a red display subportion, a green display subportion and a blue display subportion;
the display panel comprises:
display portion rows formed by the first color display subportions and second color display subportions that are laid out in a first sequence, the first sequence being the red display subportion, the green display subportion, the blue display subportion and the white display subportion, and
display portion rows formed by the first color display subportions and second color display subportions that are laid out in a second sequence, the second sequence being the blue display subportion, the white display subportion, the red display subportion and the green display subportion;
wherein the display portion rows laid out in the first sequence and the display portion rows laid out in the second sequence are alternately laid out as odd and even rows; and
in the display panel, the image detectors at the first distribution positions are above each white display subportion, and the image detectors at the second distribution positions are above the green display subportions at an interval of three white display subportions in each display portion row.

6. The display panel of claim 1, wherein the plurality of display portions comprise first-type display portions and second-type display portions;
the first-type display portions comprise the second color display subportions;
the second-type display portions at least comprise the first color display subportions and the second color subportions; and
the first color display subportions are white display subportion and the second color display subportions are unicolor or multicolor display subportions.

7. The display panel of claim 6, wherein the second-type display portions comprise red display subportions, green display subportions and white display subportions.

8. The display panel of claim 7, wherein
in the first-type display portion, the second color display subportions are laid out in a third sequence, the third sequence being the red display subportion, the green display subportion and the blue display subportion;
in the second-type display portion, the first color display subportions and the second color display subportions are laid out in a fourth sequence, the fourth sequence being the red display subportion, the green display subportion and the white display subportion;
the first-type display portions and the second-type display portions are alternately laid out in a same display portion row and alternately arranged in a same display portion column; and
the image detectors at the first distribution positions and the image detectors at the second distribution positions are alternately distributed in each row, and first ends of the image detectors are close to the first-type display portions and far from the second-type display portions.

9. The display panel of claim 1, further comprising:
a first transparent substrate, and
a second transparent substrate, arranged opposite to the first transparent substrate and serving as a display surface of the display panel, the display array being between the first transparent substrate and the second transparent substrate, wherein black matrixes (BM) isolating different display subportions are further distributed between the first transparent substrate and the second transparent substrate; and the plurality of image detectors are arranged on the BM and face the second transparent substrate.

10. The display panel of claim 1, further comprising:
a detection image processor, configured to generate the target detection image according to the photosignals detected by the plurality of image detectors and position information of each of the plurality of image detectors distributed on the display panel.

11. The display panel of claim 10, wherein each of the plurality of image detectors comprises:
an emitting element, configured to emit detection light;
a receiving element, configured to receive reflected light returned based on an action of the detection light on a detection target; and
an imaging element, connected with the receiving element and configured to generate the target detection image based on the reflected light, the target detection image comprising a fingerprint image.

12. A terminal device, comprising:
a shell;
a display panel, arranged on the shell, comprising;
a display array comprising a plurality of display portions, where each of the plurality of display portions comprises at least one display subportion; and
a plurality of image detectors, configured to detect photosignals to obtain a target detection image,
wherein the plurality of image detectors are adjacent to the plurality of display portions and have first distribution positions and second distribution positions, the first distribution positions being different from the second distribution positions; and
a controller, arranged in the shell and configured to control the plurality of image detectors in the display panel for image detection,
wherein at least part of the plurality of display portions in the display array comprise first color display subportions; each of the plurality of display portions comprises at least one second color display subportion different from the first color display subportion; the first color display subportions of the display portions in adjacent rows are in different columns respectively;
the first distribution positions are above the first color display subportions respectively; and
the second distribution positions are above only part of the second color display subportion,
wherein each image detector at the second distribution position in a non-display edge region is below the first color display subportion only,
wherein for each row of the display array, image detectors are placed in only two combinations; one type of the combinations is a one-to-two combination in which one display portion corresponds to one image detector at the first distribution position and to one image detector at the second distribution position, and the other type of the combinations is a one-to-one combination in which one display portion corresponds to one image detector either at the first distribution position or at the second distribution position.

13. The terminal device of claim 12,
a distance between a first end of each image detector at the first distribution position and the first color display subportion is a first distance;
a distance between a first end of each image detector at the second distribution position and the first color display subportion is a second distance; and
the first distance is equal to the second distance.

14. The terminal device of claim 12, wherein the first color display subportion is a white display subportion;
the second color display subportion is a unicolor or multicolor display subportion; and
in each of the plurality of display portions, a length of the first color display subportion is less than a length of the second color display subportion.

15. The terminal device of claim 14, wherein
in each of the plurality of display portions, central points of the first color display subportion and the second color display subportion are on a first straight line; or,
in each of the plurality of display portions, bottom edges of the first color display subportion and the second color display subportion are on a second straight line.

16. The terminal device of claim 15, wherein the second color display subportion comprises a red display subportion, a green display subportion and a blue display subportion;
the display panel comprises:
display portion rows formed by the first color display subportions and second color display subportions that are laid out in a first sequence, the first sequence being the red display subportion, the green display subportion, the blue display subportion and the white display subportion, and
display portion rows formed by the first color display subportions and second color display subportions that are laid out in a second sequence, the second sequence being the blue display subportion, the white display subportion, the red display subportion and the green display subportion;
wherein the display portion rows laid out in the first sequence and the display portion rows laid out in the second sequence are alternately laid out as odd and even rows; and
in the display panel, the image detectors at the first distribution positions are above each white display subportion, and the image detectors at the second distribution positions are above the green display subportions at an interval of three white display subportions in each display portion row.

17. The terminal device of claim 12, wherein the plurality of display portions comprise first-type display portions and second-type display portions;
the first-type display portions comprise the second color display subportions;
the second-type display portions at least comprise the first color display subportions and the second color subportions; and
the first color display subportions are white display subportion and the second color display subportions are unicolor or multicolor display subportions.

18. The terminal device of claim 17, wherein the second-type display portions comprise red display subportions, green display subportions and white display subportions.

* * * * *